Dec. 8, 1931.  R. J. BRITTAIN, JR  1,835,459
FEELER CONTROL GAUGE
Original Filed April 14, 1925  2 Sheets-Sheet 1
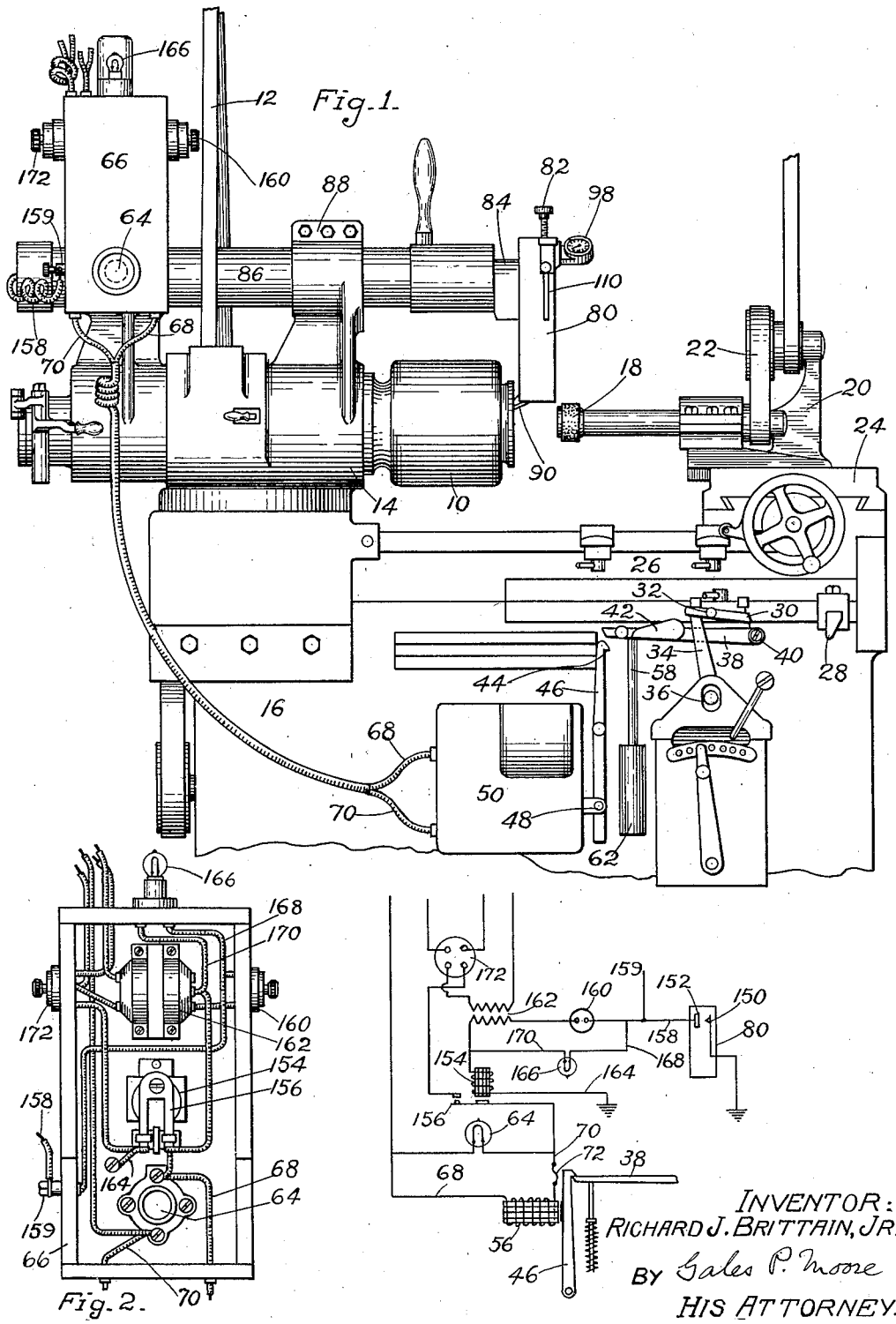
INVENTOR:
RICHARD J. BRITTAIN, JR.
BY Gales P. Moore
HIS ATTORNEY.

Dec. 8, 1931.  R. J. BRITTAIN, JR  1,835,459
FEELER CONTROL GAUGE
Original Filed April 14, 1925    2 Sheets-Sheet 2
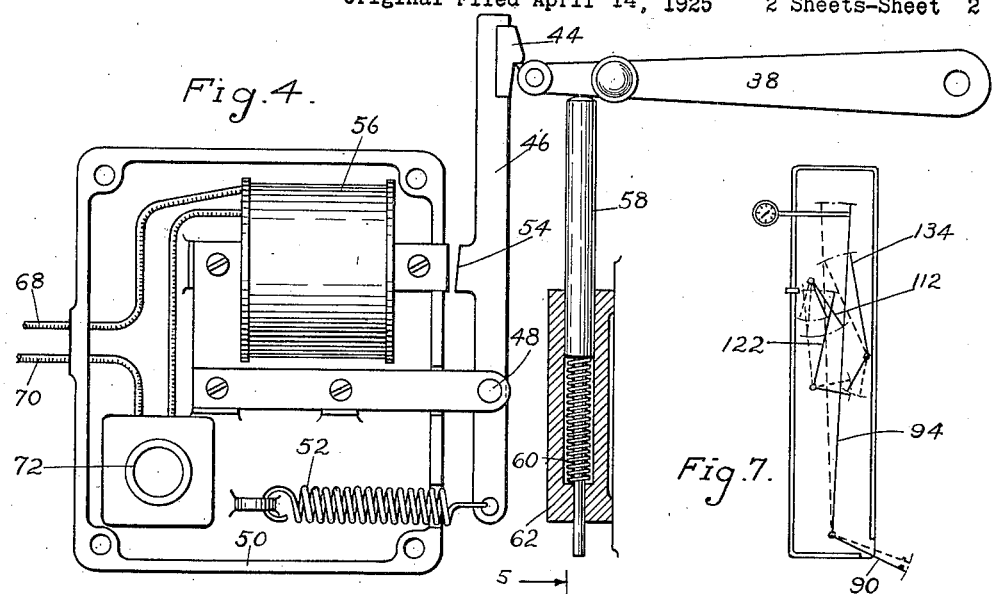
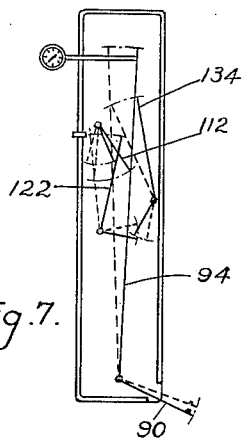
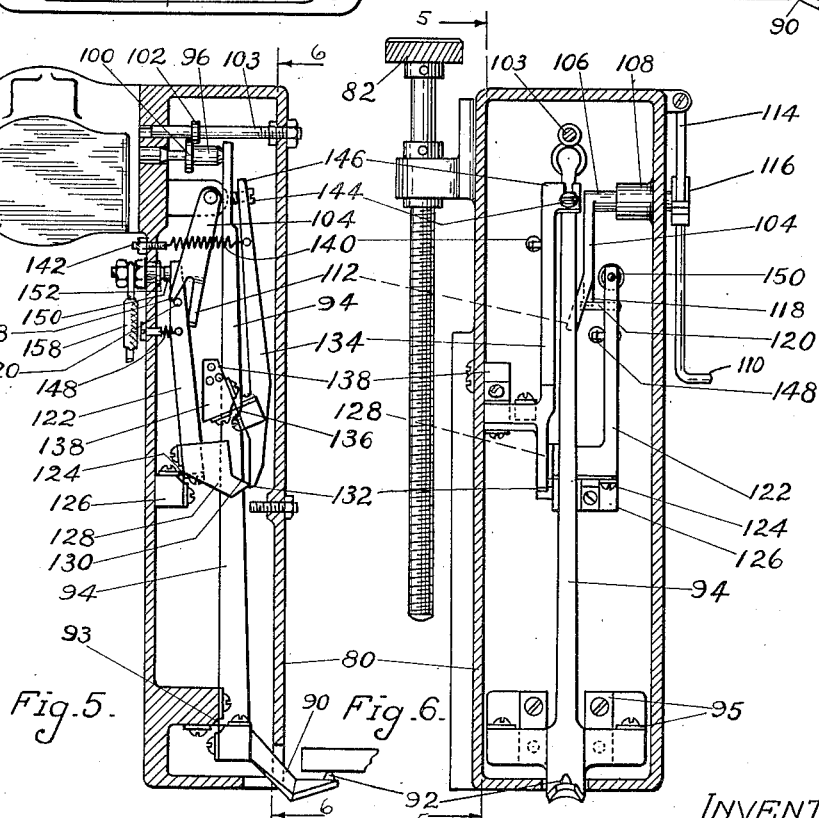
INVENTOR:
RICHARD J. BRITTAIN, JR.
By Gales P. Moore
HIS ATTORNEY.

Patented Dec. 8, 1931

1,835,459

UNITED STATES PATENT OFFICE

RICHARD J. BRITTAIN, JR., OF NEWARK, NEW JERSEY, ASSIGNOR TO GENERAL MOTORS CORPORATION, OF DETROIT, MICHIGAN, A CORPORATION OF DELAWARE

FEELER CONTROL GAUGE

Original application filed April 14, 1925, Serial No. 23,117. Divided and this application filed November 16, 1927. Serial No. 233,666.

This invention relates to feeler control mechanism for grinding machines and the like and comprises all the features of novelty herein disclosed, by way of example, as embodied in apparatus for automatically gauging a work-piece and backing a grinding wheel away from the work-piece when the latter reaches a desired size.

When a gauge is kept in contact with a work-piece being ground and indicates the change in size, an operator must be continually on the lookout to stop the machine or back the wheel away when the piece reaches the desired size. It has been proposed to have the gauge arm complete an electric circuit directly by its own motion and thus furnish some indication that the piece is ground to size but such a mechanism will be uncertain in operation because any relative deflection between the work-piece and the gauge will introduce a large variation in the position of the contacts and hence will not accurately detect the time when the piece reaches size. Furthermore the extent of motion of a gauge is so slight that good electric contact cannot be obtained and the consequent pitting or wear of the contacts introduces further errors.

It is, accordingly, an object of this invention to provide a controlling mechanism which will accurately determine when a work-piece has reached a desired size and automatically cause the wheel or other tool to become separated from the work. In the embodiment selected for illustration, accuracy is obtained by utilizing an auxiliary contact apparatus controlled by the gauge through a trip mechanism but having a movement independent of the gauge and through a wider range to secure a more definite electrical connection.

To these ends and also to improve generally upon devices of the character indicated my invention consists in the various matters hereinafter described and claimed.

In the drawings, Figure 1 is a front elevation of an internal grinder with the invention applied.

Figure 2 is a front view of certain detail parts of the control mechanism in their casing.

Figure 3 is a diagram of electrical connections.

Figure 4 is a front view of certain details.

Figure 5 is a rear view of the gauge box with its cover plate removed.

Figure 6 is a side elevation of the parts shown in Figure 5.

Figure 7 is a diagram of the gauge parts in different positions.

There are well known grinding machines on the market which have a work holding chuck and a grinding wheel mounted on a carriage which reciprocates to traverse the wheel along the work. The carriage usually has spaced dogs which alternately engage a reversing lever to change the direction of motion and it is machines of this type for which this invention is well adapted. In this invention, a gauge member or feeler is kept continually in contact with the work piece and the movement of the gauge member or feeler operates a trip to release an independently movable electrical contact making member which completes an electric circuit. This electric circuit does several things, among them effecting the movement of devices which move one of the dogs on the grinding wheel carriage to prevent the reversal of the carriage and thereby cause the wheel to back away when the work-piece is ground to size.

In Figure 1, the numeral 10 indicates a chuck for holding and rotating a ring or other work-piece to be internally ground. The chuck is rotated by a belt 12, its shaft being journalled in a headstock 14 mounted on the bed or frame 16 of an internal grinder. A grinding wheel 18 has its spindle journalled in a standard 20 and is driven by belt 22. The standard is carried by a slide 24 mounted for cross feeding movement on a reciprocating carriage 26 having dogs 28 and 30 for automatically operating a reversing mechanism. The dog 30 is pivoted at 32 on the carriage so that it can be raised to prevent its engaging a reverse lever 34 pivoted at 36, as when the work has reached size and it is desired to back the grinding wheel away from the work. The dog 30 is actuated automatically by novel mechanism controlled by work gauging instrumentalities.

An arm 38, pivoted at 40 on the frame and carrying a cam member 42, is normally locked in a depressed position by a hook 44 on a latch arm 46 pivoted at 48 on a magnet casing 50. In the depressed positions of the arm 38 and cam member 42, the dog 30 will engage the reverse lever 34 in the usual way. A spring 52 holds the latch arm 46 in locking position but an armature 54 on the latch arm is arranged to be attracted by a magnet 56 to release the latch arm. Upon the release of the latch arm, a plunger rod 58 is lifted by a coil spring 60 in a guide 62 and the cam member 42 on the arm 38 is lifted to such a position that the pivoted dog 30 will be guided freely over the upper end of the reverse lever 34 whereupon the carriage will back the grinding wheel away from the work without reversing. The magnet is controlled by the gauging instrumentalities as will later appear. To furnish a signal, easily visible at a distance, that the work has been ground down to size, a red light 64 in a box 66 fastened on the headstock is connected up in parallel with the magnet circuit, wires 68 and 70 leading to the magnet through an interposed fuse 72 in the casing 50. The magnet and red light circuits are closed by a magnetic switch also under control of the gauging instrumentalities.

Referring to Figures 1, 5 and 6, a gauge box, frame or housing 80 is adjustably mounted by a hand operated screw 82 on an arm 84 which is capable of a sliding and swinging movement in a hollow sleeve 86 mounted in standards 88 directly on the headstock. For details of this mounting reference may be made to a copending application of Chapman and Brittain, Serial No. 715,906, filed May 26, 1924. The sliding and swinging movement is to enable a gauge arm 90 having a gauge point or feeler 92 to be moved into and out of the interior of a ring or other work-piece. The gauge arm 90 is the shorter arm of a gauge lever pivoted at 93 in a well known manner on pairs of thin crossed springs 95 at right angles to one another in the gauge box and the longer arm 94 extends lengthwise of the box and its end abuts against a gauge stem 96 on an indicator 98. The gauge stem carries a collar 100 arranged to engage a collar 102 on a rod 103 to limit the movement of the indicator needle.

To prevent the gauge point or feeler 92 from interfering with the end of the work-piece when the gauge is being applied, the long arm 94 is swung to one limit of movement by a forked crank 104 as indicated in Figures 5 and 6. The crank has its shaft 106 rockably mounted in a hollow boss 108 on the interior of the gauge box and is operated by a crank handle 110 outside the box. The forked crank has its longer arm 112 bent laterally to overlie and engage the arm 94 and the handle 110 can be locked temporarily by a spring pawl 114 which engages a notch in the hub 116 of the handle. When the gauge point or feeler has been placed inside the work-piece, the forked crank is released and locked in another position so that thereafter the gauge point or feeler will ride yieldingly against the work. The gauge point or feeler is designed to continually ride against the work piece at the top interior surface thereof while the grinding wheel engages the work piece at a point 90° away. This minimizes the effect on the indicator and gauge of any deflection of the work-piece, due to pressure of the wheel. Having the gauge mounted on the same support as the work holder also minimizes any relative deflection. The other parts in the gauge box have mainly to do with the setting of a trip mechanism and the establishment of a good electrical contact for a circuit immediately when the work-piece is ground down to the desired size.

The forked crank 104 has a short arm 118 arranged to engage a pin 120 projecting from an arm on an electric contact making lever 122 pivoted at 124 on crossed springs supported on a cleat 126 in the box. The contact making lever has an offset plate or arm 128 at one side of arm 94 with a face 130 arranged to hook in front of the point 132 of a detent or trip lever 134 pivoted at 136 on crossed springs supported on a cleat 138 in the box. A coil spring 140 attached to the trip lever and to an adjusting screw 142 on the box tends to pull the lever to releasing position. This spring also furnishes the pressure to cause the gauge point or feeler to follow up the work as it is ground and transmits this tendency to arm 94 through an adjusting screw 144 fastened in a lateral extension 146 of the trip lever. The trip lever is shown in Figure 5 in its releasing position where its point 132 is moved to release the face 130 of the plate or arm 128. The adjusting screw 144 provides an accurate means to adjust the trip lever with relation to the contact making lever. When released, the contact making lever 122 is immediately pulled to the position shown in Figure 5, by a coil spring 148 which forces a contact piece 150 on the contact making lever against a fixed contact 152 on the box. The contact making lever is electrically grounded on the frame and the union of the contacts 150 and 152 completes a circuit which energizes a magnet 154 to close a magnetic switch 156. A wire 158 leads from the fixed contact 152 through the hollow-sleeve 86 of the gauge mounting to a binding post 159 on the box 66 and the binding post is electrically connected to a one-pole switch 160. This switch 160 is connected to the secondary winding of a transformer 162 in circuit with the magnet 154 which is grounded through a wire 164. A white light 166 is connected by wires 168 and 170 to the secondary winding of the transformer to indicate when the one-pole switch 160 is closed. The primary winding is in circuit with an A. C. line through a double pole switch 172 which also closes a D. C. circuit through the magnet 56 and the switch 156.

In operation, the crank handle 110 is turned to move the gauge parts to the position indicated by full lines in Figure 7. Then the gauge box 80 is slid and swung on its mounting in the sleeve 86 until the gauge point or feeler 92 is inside the work-piece. Then the crank handle 110 is turned to allow the spring 140 to press the gauge point or feeler continually against the work-piece and the work-piece is ready to be ground. When the work-piece reaches the desired size as determined by the previous adjustment of the screw 144 and the prior relative positions of trip lever 134 and contact making lever 122, the trip lever releases the contact making lever which is pulled by the spring 148 to unite the contacts 150 and 152. This completes the circuit through the magnet 154, closes the magnetic switch 156, and energizes the magnet 56 to operate latch arm 46 and release the arm 38. The spring pressed rod 58 then elevates the cam member 42 into the path of the pivoted dog 30 which is raised to allow the wheel carriage to back away from the work-piece without reversing. The red light 64 is also lighted to signal to the operator that the roughing cut is finished. The operator may then apply another work-piece or give the first piece a finish grind under hand feed control at his convenience.

Although the invention has been described by reference to a specific construction, it should be understood that, in its broader aspects, it is not necessarily limited to the form selected for mere illustrative purposes.

This application is a division of my co-pending application, Serial No. 23,117, filed April 14, 1925.

I claim:

1. In apparatus of the character described, a feeler for contact with the surface of a work-piece during machining, an electric contact making member movable independently of the feeler and through a wider range than the feeler for completing a machine control circuit, and mechanism controlled by the feeler at the instant the work-piece reaches size for moving the contact making member immediately to its circuit completing position; substantially as described.

2. In apparatus of the character described, a feeler for contact with the surface of a work-piece during machining, an electric contact making member movable independently of the feeler and through a wider range than the feeler for completing a machine control circuit, a spring for moving the member to circuit completing position, and a trip member actuated by the feeler for releasing the contact making member at the instant the work reaches size; substantially as described.

3. In apparatus of the character described, a feeler for contact with the surface of a work-piece during machining, a spring pressed electric contact making member movable independently of the feeler and through a wider range than the feeler to complete a machine control circuit, a trip member for holding the contact making member in open circuit position, and a spring for causing the trip member to move with the feeler to release the contact making member; substantially as described.

4. In apparatus of the character described, a feeler for contact with the surface of a work-piece during machining, an electric contact making member movable independently of the feeler to complete a machine control circuit, a trip lever for holding the contact making member in open circuit position, means for moving the trip lever to release the contact making member, and an arm for setting the contact making member in holding engagement with the trip lever; substantially as described.

5. In apparatus of the character described, a feeler for contact with the surface of a work-piece during machining, an electric contact making member movable independently of the feeler and through a wider range than the feeler to complete a machine control circuit, a trip lever for holding the contact making member in inoperative position, an arm for setting the contact making member in holding engagement with the trip lever, and means for causing the trip lever to move with the feeler so as to release the contact making member; substantially as described.

6. In apparatus of the character described, a feeler for contact with the surface of a work-piece during machining, an electric contact making member movable independently of the feeler and through a wider range than the feeler to complete a machine control circuit, a trip lever for holding the contact making member in inoperative position, means for setting the contact making member in holding engagement with the trip lever, means for causing the trip lever to move with the feeler so as to release the contact making member, and means for adjusting the initial position of the trip lever with respect to the contact making member; substantially as described.

7. In apparatus of the character described, a feeler for contact with the surface of a work-piece during machining, an electric contact making member movable independently of the feeler and through a wider range than the feeler to complete a machine control circuit, a trip lever for holding the contact making lever in open circuit position, means for moving the trip lever to release the contact making member, and a forked member for swinging the feeler and setting the contact making member in locking engagement with the trip lever; substantially as described.

8. In apparatus of the character described, a gauge housing, a member movably mounted in the housing and having a feeler for engaging a work-piece during machining, a spring pressed electric contact making member in the housing for completing an electric control circuit, said contact making member being mounted for a wide range of movement independently of the feeler, and a trip member actuated by the feeler carrying member for releasing the contact making member; substantially as described.

9. In apparatus of the character described, a feeler for contact with the surface of a work-piece during machining, a gauge housing, a lever pivoted in the gauge housing and movable under control of the feeler, an arm pivoted in the gauge housing and having an electric contact making member, said arm having a wide range of movement independently of the lever, a spring for pressing the arm to contact making position to complete a machine control circuit, and means controlled by the lever for latching or releasing the arm; substantially as described.

10. In apparatus of the character described, a gauge housing, a lever pivoted in the housing and having a feeler arm projecting therefrom to engage the surface of a work-piece during machining, an arm pivoted in the housing and having an electric contact making member to complete an electric control circuit of the machine, said arm having a wider range of movement than the lever, means for effecting such wider range of movement of the arm, and a cooperating contact member mounted on the housing, the movement of the feeler lever controlling the engagement of the contact members when the work-piece reaches size; substantially as described.

11. In a grinding machine, a bed, a work holding device, an abrading device, a carriage for one of said devices, movable toward or from abrading proximity to the other, a frame mounted on said bed, an arm on said frame adapted to close an electric circuit, means actuated by said circuit for stopping the grinding operation, a second arm on said frame tending normally to prevent closing said circuit, a third arm mounted to maintain contact with the surface being ground and cooperating with said second arm, means to move said second arm to release said first arm, means whereby said third arm controls the movement of said second arm, and means whereby said second arm releases said first arm when the work has been ground to the exact size desired, substantially as set forth.

12. In apparatus of the character described, in combination, a machining tool, a work holder, mechanism for causing a relative movement between the tool and the work holder, means for reversing the direction of motion, a feeler having continuous contact with the surface of a work-piece being machined on the holder, an electric contact making member movable independently of the feeler for completing a circuit to stop the operation of the reversing means, a spring for moving the member to circuit completing position, and a trip lever actuated by the feeler for releasing the contact making member at the instant the work reaches size; substantially as described.

13. In apparatus of the character described, in combination, a machining tool, a work holder, mechanism for causing a relative movement between the tool and the work holder, means for reversing the direction of motion, a feeler having continuous contact with the surface of a work-piece being machined on the holder, an electric contact making member movable independently of the feeler, and mechanism controlled by the feeler when the work-piece reaches size for causing the contact making member to immediately make a circuit completing movement independently of the feeler to effect a separation of the tool and the work; substantially as described.

14. In an internal grinding machine, abrading means, work holding means, means to move one of said means with respect to the other thereof, and means for controlling the said moving means, comprising a housing, a normally open electric circuit in said housing, an arm adapted to close said circuit, a second arm mounted in said housing tending normally to prevent closing said electric circuit, a third arm in contact with a work-piece and adapted to co-operate with said second arm, means to move said second arm to release said first arm, and means whereby said third arm controls the movement of the second arm so as to release the first arm when the desired size has been attained; substantially as described.

15. In a device for controlling the cutting operation on a piece of work, an electric contact making member, a detent for preventing movement of the contact making member to contact making position, a feeler to engage the work-piece which is being cut, and means whereby the work-engaging feeler actuates the detent to release the contact making member; substantially as described.

16. In a device for controlling the cutting operation on a piece of work, a feeler to engage the work-piece, an electric contact making member movable through a wider range than the feeler to complete a control circuit, a detent for holding the electric contact making member in a position ready for movement, and operating connections from the feeler to the detent to release the contact making member for a movement to circuit completing position independently of the feeler; substantially as described.

17. In a device for controlling the cutting operation on a piece of work, an electric contact making member, means for releasably holding said member in inoperative position, means tending to spring said member to operative position, and means controlled by the work for releasing said holding means; substantially as described.

18. In a device of the character described, a feeler for engaging a work-piece during machining, a gauge housing, a lever pivoted in the gauge housing and actuated from the feeler, an arm pivoted in the housing and having an electric contact making member, a cooperating contact member, a spring for pressing the arm in a direction to bring the contact members together to complete an electric control circuit of the machine, and a trigger bar mounted on the lever for latching or releasing the arm; substantially as described.

In testimony whereof I hereunto affix my signature.

RICHARD J. BRITTAIN, Jr.